United States Patent
Talley et al.

(10) Patent No.: US 8,059,579 B1
(45) Date of Patent: Nov. 15, 2011

(54) METHOD AND SYSTEM FOR PROVIDING WIRELESS SERVICE ACCORDING TO MULTIPLE WIRELESS-COMMUNICATION PROTOCOLS ON A SINGLE RADIO-FREQUENCY (RF) CARRIER

(75) Inventors: Ryan S. Talley, Overland Park, KS (US); Bryan T. Barbee, Olathe, KS (US); Timothy W. Sill, Platte City, MO (US); Christopher M. Yenney, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 894 days.

(21) Appl. No.: 12/062,684

(22) Filed: Apr. 4, 2008

(51) Int. Cl.
*H04B 7/212* (2006.01)
*H04J 3/00* (2006.01)

(52) U.S. Cl. ......... 370/321; 370/336; 370/345; 370/442

(58) Field of Classification Search .................. 370/321, 370/336–337, 345, 347, 442
See application file for complete search history.

(56) References Cited

U.S. PATENT DOCUMENTS

| | | | | |
|---|---|---|---|---|
| 5,134,615 A | * | 7/1992 | Freeburg et al. | 370/347 |
| 5,712,868 A | * | 1/1998 | Stern et al. | 375/132 |
| 5,732,076 A | * | 3/1998 | Ketseoglou et al. | 370/347 |
| 7,577,443 B1 | * | 8/2009 | Moll et al. | 455/456.1 |
| 2007/0275746 A1 | * | 11/2007 | Bitran | 455/509 |
| 2008/0159239 A1 | * | 7/2008 | Odlyzko et al. | 370/337 |

OTHER PUBLICATIONS

Andrew, OneBase Base Station Systems, printed from the World Wide Web on Mar. 27, 2008.

* cited by examiner

*Primary Examiner* — Tri H Phan

(57) ABSTRACT

Methods and systems are provided for providing wireless service using multiple protocols on a single radio-frequency (RF) carrier. According to an embodiment, a low-cost Internet base station (LCIB) provides wireless service on an RF carrier using a first wireless-communication protocol and provides wireless service on the RF carrier using a second wireless-communication protocol, where providing wireless service on the RF carrier using the first wireless-communication protocol and providing wireless service on the RF carrier using the second wireless-communication protocol occur at different times. The LCIB may alternate between providing wireless service using the first wireless-communication protocol and providing wireless service using the second wireless-communication protocol.

14 Claims, 5 Drawing Sheets

METHOD AND SYSTEM FOR PROVIDING WIRELESS SERVICE ACCORDING TO MULTIPLE WIRELESS-COMMUNICATION PROTOCOLS ON A SINGLE RADIO-FREQUENCY (RF) CARRIER

BACKGROUND

1. Technical Field

The present invention relates to wireless networks, and, more particularly, to wireless networks that include a Low-Cost Internet Base Station (LCIB).

2. Description of Related Art a. Cellular Wireless Networks

Many people use mobile stations, such as cell phones and personal digital assistants (PDAs), to communicate with cellular wireless networks. These mobile stations and networks typically communicate with each other over a radio-frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMAX, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

b. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

As noted above, LCIBs typically provide wireless service according to a single wireless-communication protocol on a single RF carrier. Alternatively, where multiple wireless-communication protocols are supported by a single LCIB, the LCIB typically provides wireless service on multiple RF carriers (on a single carrier per technology). This is undesirable for at least the reason that it requires hardware to support two simultaneous carriers. Additional hardware adds to the cost of an LCIB.

In accordance with embodiments of the present invention, an LCIB is arranged to provide wireless service on a single RF carrier using a first wireless-communication protocol and, at a different time, provide wireless service on the same RF carrier using a second wireless-communication protocol. In an embodiment, an LCIB may alternate between providing wireless service on the RF carrier using the first wireless-communication protocol and providing wireless service on the RF carrier using the second wireless-communication protocol. Preferably, the LCIB alternates between the first and second wireless-communication protocols on a periodic basis.

Beneficially, an LCIB in accordance with embodiments of the present invention is capable of providing wireless service according to multiple wireless-communication protocols and does not require hardware to support two simultaneous carriers. An LCIB in accordance with embodiments of the present invention requires only a single RF transceiver.

2. Exemplary Architecture a. An Exemplary Communication System

Figure 1:
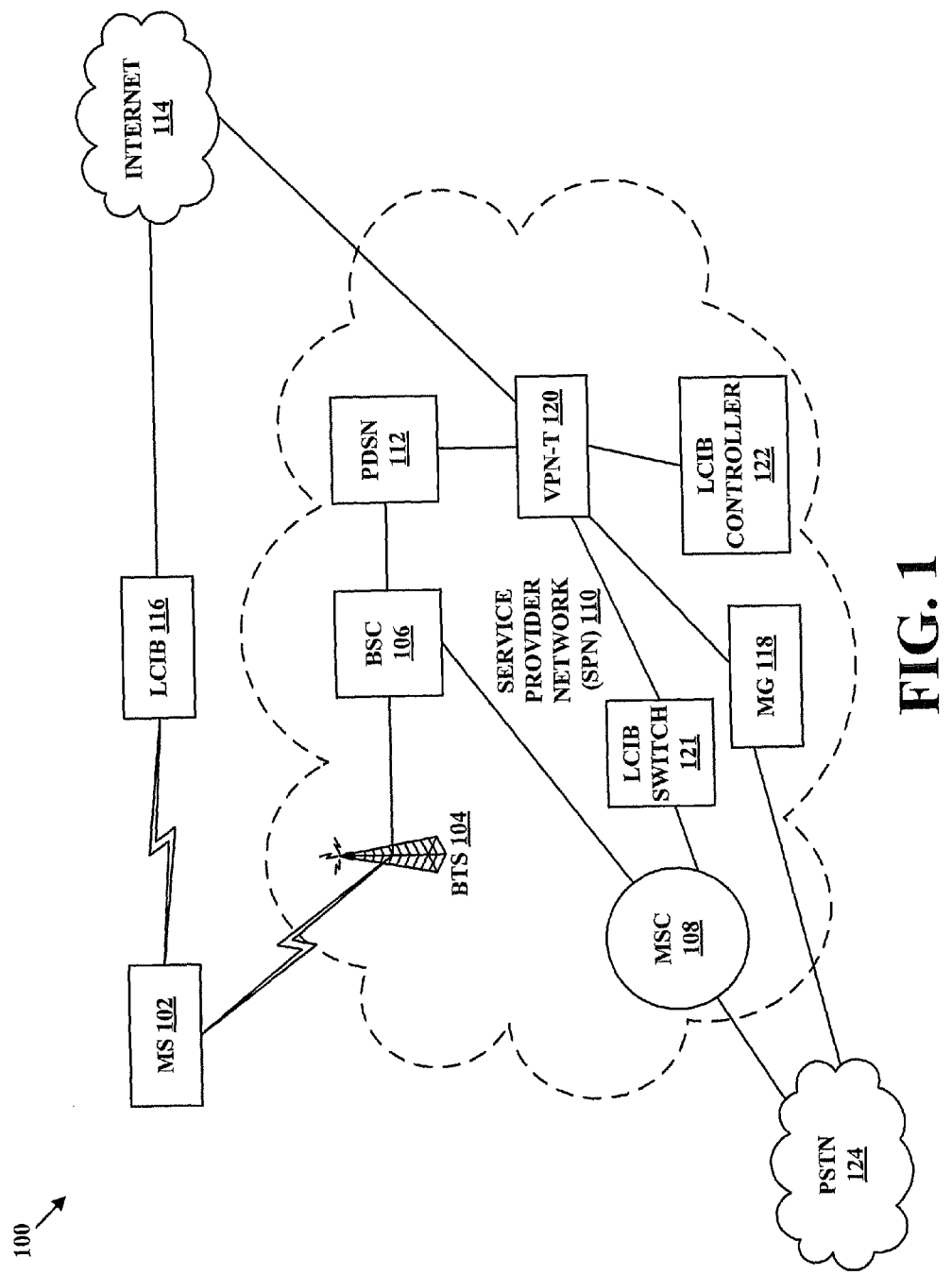
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB switch 121, an LCIB controller 122, and a public switched telephone network (PSTN) 124. And additional entities could be present, such as additional mobile stations in communication with BTS 104 or LCIB 116, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions.

The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network. MSC 108 may also be in communication with LCIB switch 121, which in turn may be in communication with VPN-T 120.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and VPN-T 120. VPN-T 120 may communicate with Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include (i) an RF interface for providing service to mobile stations according to a first wireless-communication protocol (such as CDMA) and, at a different time, a second wireless-communication protocol (such as EV-DO) and (ii) an Ethernet or WiFi interface for communicating over Internet 114 via a device such as a router and/or cable modem. LCIB 116—also described in connection with FIG. 2—may also have a GPS receiver and/or other location module.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include both a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond. VPN-T 120 may be in communication with MG 118.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond. Among other functions, LCIB controller 122 communicates via VPN terminator 120 with LCIBs such as LCIB 116. LCIB controller 122 may be operable to select various operational parameters for LCIBs (e.g. carrier, pseudorandom number (PN) offset, whether to broadcast a pilot-beacon, contents of any pilot beacon to be broadcast, transmission-power level).

b. An Exemplary LCIB

Figure 2:
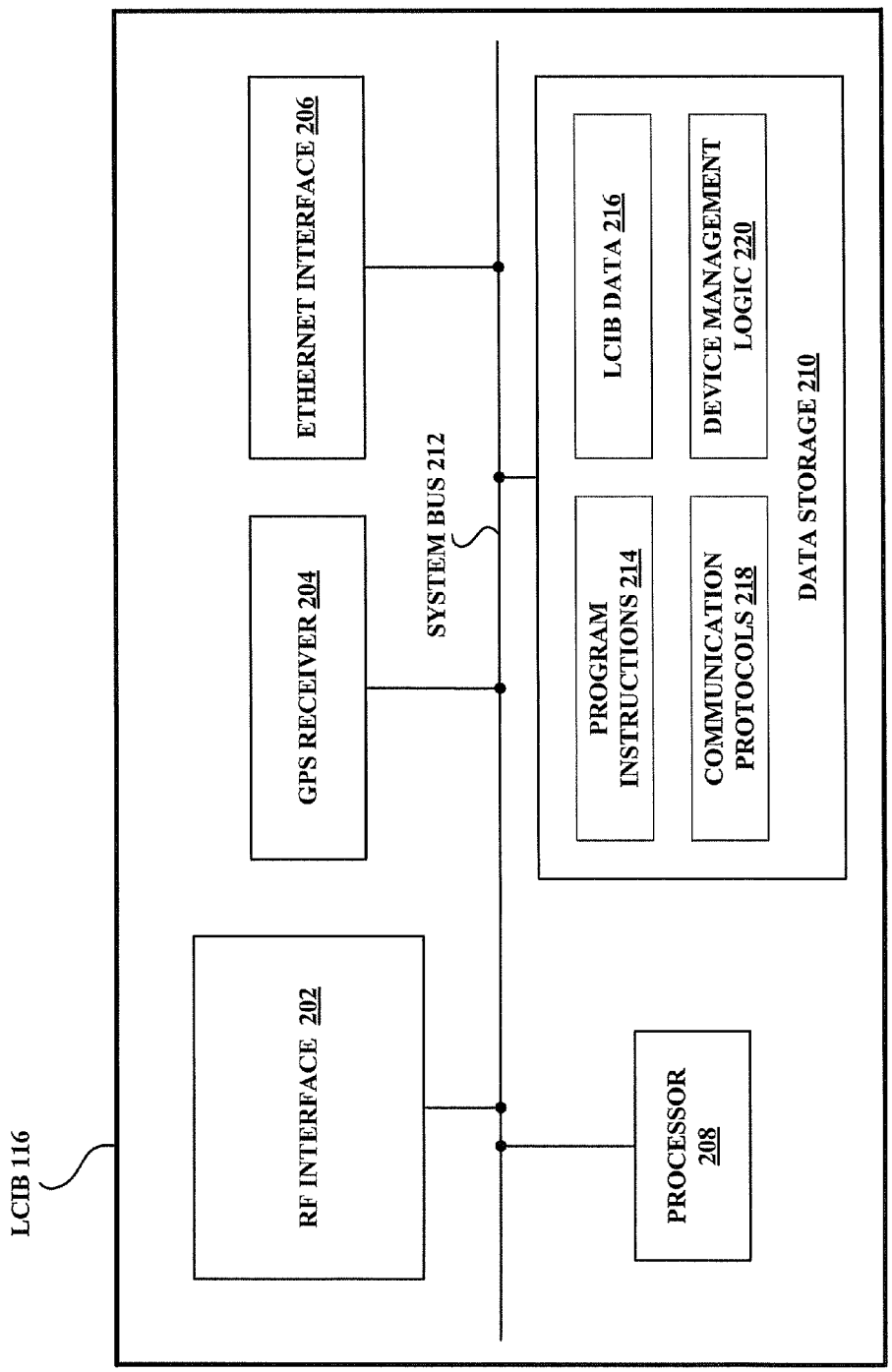
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, one or more channel elements, and/or one or more other components suitable for providing a wireless coverage area according to multiple wireless-communication protocols (e.g., CDMA, EV-DO, GSM, WiMAX, etc.). In particular, in an embodiment, RF interface 202 may function to (i) provide wireless service on a carrier using CDMA for a first period of time and (ii) provide wireless service on the same carrier using EV-DO for a second period of time. Note that these protocols could be reversed, and either or both could be replaced with any suitable wireless protocol.

GPS receiver 204 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor.

The data storage 210 may take various forms, in one or more parts, such as a non-volatile storage block and/or a removable storage medium, and may include (a) program instructions 214 executable by processor 208 for carrying out the LCIB functions described herein (such as using RF interface 202 to provide wireless service to mobile stations on a carrier using a first wireless-communication protocol and then using RF interface 202 to provide wireless service on the same carrier to mobile stations using a second protocol), (b) LCIB data 216, which may be data stored by LCIB 116, (c) communication protocols 218, facilitating and enabling communication with one or more other devices, and (d) device management logic 220, perhaps for memory and file management.

3. Exemplary Operation a. A First Exemplary Method

Figure 3:
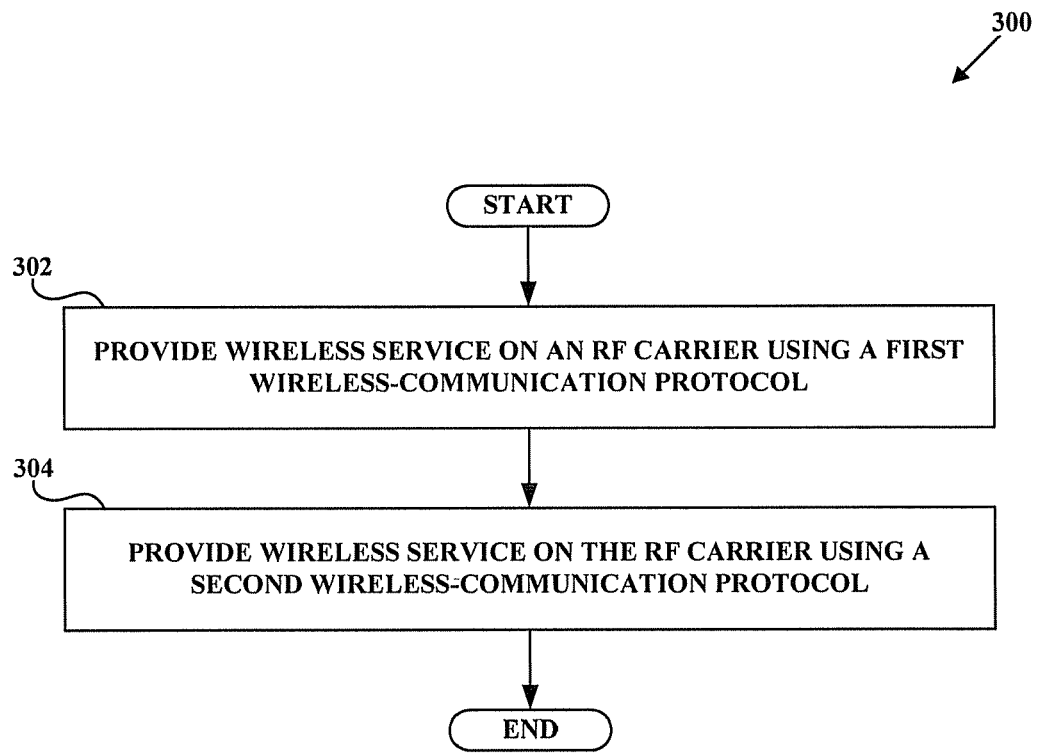
FIG. 3 is a flowchart of a method, in accordance with exemplary embodiments.

FIG. 3 depicts a flowchart of an exemplary method, in accordance with an exemplary embodiment. In particular, FIG. 3 depicts a method 300 for an LCIB to provide wireless service according to multiple wireless-communication protocols on a single RF carrier. As shown in FIG. 3, method 300 begins at step 302, where LCIB 116 provides wireless service on an RF carrier using a first wireless-communication protocol. At step 304, LCIB 116 provides wireless service on the RF carrier using a second wireless-communication protocol. Steps 302 and 304 occur at different times. For example, LCIB 116 may provide wireless service on the RF carrier using a first wireless-communication protocol during a first period of time, and then LCIB 116 may provide wireless service on the RF carrier using a second wireless-communication protocol during a second period of time that is different from the first period of time. The first and second wireless-communication protocols may be two protocols selected from existing wireless-communication protocols well known in the art or others developed in the future. Examples of existing protocols include CDMA (e.g., 1xRTT), EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth. Each protocol may define its own procedures for handoff between coverage areas and may define other procedures and parameters related to air-interface communication. In an exemplary embodiment, the first and second wireless-communication protocols are CDMA and EV-DO.

It should be noted that, although method 300 is described as being carried out by LCIB 116, this is not required. In some embodiments, method 300 may be carried out by LCIB 116 in cooperation with one or more other network entities, such as VPN terminator 120 or LCIB controller 122. In general, method 300 could be carried out by any one or any combination of network elements described herein, or any other element(s). In addition, method 300 could also be employed in a macro network. For example, method 300 could be employed in a macro base station located in a rural area that typically has a low volume of cellular traffic.

In a preferred embodiment, LCIB 116 alternates between providing wireless service on the RF carrier using the first wireless-communication protocol and providing wireless service using the second wireless-communication protocol. LCIB 116 may alternate between the first and second wireless-communication protocols on a periodic basis. For example, LCIB 116 may repeatedly spend 30 seconds providing wireless service using the first wireless-communication protocol and then spend 30 seconds providing wireless service using the second wireless-communication protocol. Another example of the periodic basis may be repeatedly spending 30 seconds on the first wireless-communication protocol and then spending 15 seconds on the second wireless-communication protocol. Alternatively, LCIB 116 may alternate between the first and second wireless-communication protocols on a non-periodic basis.

LCIB 116 preferably is provisioned to have different modes of alternating between the first and second wireless-communication protocols. For example, program instructions 214 executable by processor 208 may carry out the function of changing the mode of alternating between the first and second wireless-communication protocols. The different modes of alternating between the protocols for LCIB 116 may depend on a variety of factors. For instance, the way LCIB 116 alternates between the first and second wireless-communication protocols may depend on (i) whether a mobile station is registered with LCIB 116, (ii) how many mobile stations are registered with LCIB 116, (iii) whether LCIB 116 receives an origination request from a mobile station, or (iv) whether LCIB 116 receives a termination request for a mobile station registered with LCIB. Other factors are possible as well.

Figure 4A:
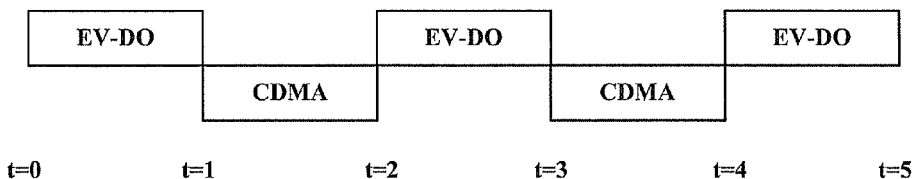
FIGS. 4*a*-4*d* are depictions of different modes of alternating between a first wireless-communication protocol and a second wireless-communication protocol, in accordance with exemplary embodiments.

Different modes of alternating between the first and second wireless-communication protocols are depicted in FIG. 4 and are explained in more detail in the following subsections. It should be understood that while the wireless-communication protocols depicted in FIG. 4 are CDMA and EV-DO, the wireless-communication protocols may be any wireless-communication known or later developed. Further, it should be understood that the modes of alternating between the first and second wireless-communication protocols are not limited to the modes discussed below. LCIB 116 may alternate between the first and second wireless-communication protocols in any manner.

i. Situation 1: Mode of Alternating for an LCIB Prior to Mobile Station Registration As mentioned above, LCIB 116 may alternate between the first and second wireless-communication protocols on a periodic basis. In a preferred embodiment, LCIB 116 may provide wireless service over a total period of time that is divided into a number of time segments, and the periodic basis (for alternation) may be every time segment. For example, a time segment may be equal to the time t, and LCIB may alternate between CDMA and EV-DO every time t, as depicted in FIG. 4*a*. Time t may be any amount of time. For example, time t may be equal to 1 minute. Therefore, in this situation, LCIB 116 would repeatedly provide wireless service using EV-DO for 1 minute and then using CDMA for the following minute.

Alternatively, each segment of time t may be a positive integer number of slot cycles (i.e., 1, 2, 3, . . . , n slot cycles). A slot cycle may have a duration of time that is defined by LCIB 116. In a wireless communication system, an air interface paging channel may be divided into a number of timeslots in which a base station can transmit a page message to a mobile station. In order to conserve mobile-station battery power, each mobile station will typically be arranged to alternate at a given "slot cycle index" (SCI), which defines the frequency as which a mobile station will wake up and check the paging channel for a page. For instance, under CDMA, a mobile station operating at slot cycle index 0 (zero) would wake up and check for a page every 1.28 seconds, whereas a mobile station operating at slot cycle index 2 would wake up and check for a page every 5.12 seconds. Other slot cycle indices are possible.

In a preferred embodiment, mobile stations operate under slot cycle index 2 and the duration of the slot cycle is 5.12 seconds. Since time t may be a positive integer number of slot cycles, time t may have a duration that is a multiple of 5.12 seconds (e.g., 5.12 seconds, 10.24 seconds, 15.36 seconds, 20.48 seconds, etc.). Alternatively, it is possible that time t has a duration that is less than the duration of a slot cycle.

In practice, transitioning between the first and second wireless-communication protocols (e.g., CDMA and EV-DO) may take a short amount of transition time. For example, the transition time may be on the order of 10-20 milliseconds. Accordingly, it should be understood that for a given time segment, LCIB 116 may not provide wireless service using a given wireless protocol for the entire time segment. Therefore, when FIG. 4*a* depicts that LCIB 116 provides wireless service using EV-DO for the time period between t=0 and t=1 and then switching to CDMA, it should be understood that LCIB 116 may be providing wireless service using EV-DO for an amount of time that is equal to the time t minus at least some transition time, and perhaps minus some additional time for administrative or other purposes.

ii. Situation 2: Mode of Alternating for an LCIB after Mobile Station Registration In a preferred embodiment, LCIB 116 changes its mode of alternating between providing wireless service using a first wireless-communication protocol and providing wireless service using a second wireless-communication protocol when a mobile station (or mobile stations) registers with LCIB 116. Further, the mode of alternating may depend on how many mobile stations operating according to a certain wireless-communication protocol (e.g., CDMA or EV-DO) are registered with LCIB 116. As described above, LCIBs typically emit a pilot beacon that includes administrative messages and parameters that mobile stations can use to facilitate handoffs from the macro network to the LCIB's carrier. In particular, the pilot beacon typically includes channels known as the pilot, paging, and sync channels. Among the purposes of the LCIB's pilot beacon is to advertise the LCIB's carrier in the LCIB's coverage area, such that mobile stations can opt to tune to that carrier and communicate via the LCIB.

Accordingly, when a mobile station using the first wireless-communication protocol is positioned in the coverage area of LCIB 116, the mobile station may register with LCIB 116 when LCIB 116 is providing wireless service using the first wireless-communication protocol. Similarly, when a mobile station using the second wireless-communication protocol is positioned within the coverage area of LCIB 116, the mobile station may register with LCIB 116 when LCIB 116 is providing wireless service using the second wireless-communication protocol.

A mobile station may be within range of LCIB 116 for a period of time before it is able to register with LCIB 116, due to the fact that, at the time the mobile station comes within range, LCIB 116 may not be providing wireless service using the wireless-communication protocol that the mobile uses. For example, if a mobile station using EV-DO comes within range of LCIB 116 when LCIB 116 is providing wireless service using CDMA, the mobile station will have to wait until LCIB 116 transitions to providing wireless service using EV-DO. The amount of waiting time will depend on how long it is before LCIB 116 switches to providing wireless service using EV-DO.

In some instances, a mobile station may be capable of accessing multiple types of networks for wireless service. Such mobile stations are known as hybrid access terminals. A CDMA/EV-DO hybrid access terminal may be capable of accessing both CDMA and EV-DO networks. Therefore, it is possible that a hybrid access terminal could register with LCIB 116 for use according to both CDMA and EV-DO.

As mentioned above, LCIB 116 may change its mode of alternating between providing wireless service using a first wireless-communication protocol and providing wireless service using a second wireless-communication protocol when a mobile station or mobile stations register with LCIB 116. For example, two mobile stations using EV-DO may register with LCIB 116. In a preferred embodiment, before the two mobile stations register with LCIB 116, the LCIB alternated between the EV-DO and CDMA every time t, as depicted in FIG. 4*a*. However, after the mobile stations register with LCIB 116, LCIB 116 may repeatedly (i) provide service using EV-DO for a first amount of time and (ii) provide service using CDMA for a second amount of time, where the first amount of time is greater than the second amount of time, as depicted in FIG. 4*b*.

Figure 4B:
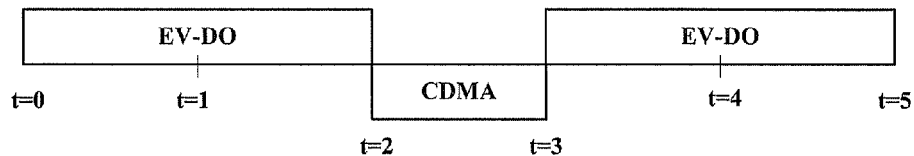

In FIG. 4*b*, LCIB 116 repeatedly provides wireless service using EV-DO for two time segments t, and then provides wireless service using CDMA for one time segment t. By doing so, LCIB 116 may favor the wireless-communication protocol that has the greatest number of registered mobile stations. This is beneficial because LCIB 116 would then be available to the registered mobile stations for communication sessions for a longer period of time, yet LCIB 116 would also still broadcast a pilot beacon under the other protocol so that mobile stations using the other protocol could register with LCIB 116.

Continuing the above example, when LCIB 116 does transition to providing service using the second wireless-communication protocol (e.g. CDMA), LCIB 116 preferably spends at least one slot cycle providing service using CDMA. By doing so, mobile stations operating according to CDMA within range of LCIB 116 could register during that time.

Accordingly, time segment t, as depicted in FIG. 4b, preferably has a duration of at least the duration of a slot cycle (e.g., 5.12 seconds).

In a preferred embodiment, LCIB 116 may also take advantage of the fact that, under some wireless-communication protocols (e.g., EV-DO), a mobile station and base station may be able to negotiate for the use of a particular paging slot within a slot cycle. For example, assuming a slot cycle having a duration of 5.12 seconds, the mobile station and base station could negotiate for use of the paging slot that is at 2.5 seconds of a 5.12 second slot cycle. Under other wireless-communication protocols (e.g., CDMA), a mobile station and base station cannot negotiate for use of a particular paging slot. Rather, the paging slot under such protocols is assigned to the mobile station.

Figure 4C:
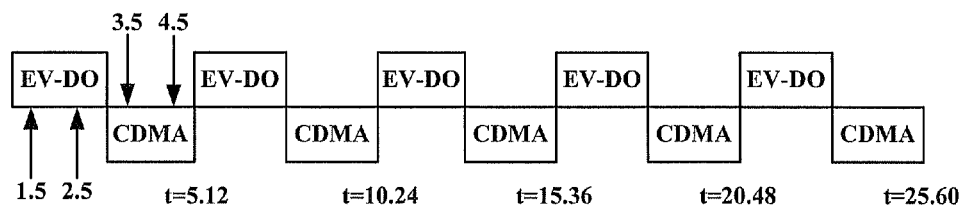

A situation in which LCIB 116 takes advantage of this fact is depicted in FIG. 4c. For the purposes of discussion, assume that two mobile stations using CDMA register with LCIB 116 and are assigned paging slots at 3.5 seconds and 4.5 seconds of a 5.12 second slot cycle. Next, assume that two mobile stations using EV-DO register with LCIB 116. Since the LCIB and EV-DO mobile stations may negotiate for the use of a particular paging slot, the mobile stations may be given respective paging slots that are before the paging slots of the CDMA mobile stations. For instance, the paging slots may be at 1.5 seconds and 2.5 seconds. The LCIB 116 may adjust its mode of alternating between EV-DO and CDMA taking into account what paging slots mobile stations registered with the LCIB have. Further, if, for example, another EV-DO mobile station registers with LCIB 116, the paging slot of that mobile station could be placed at a point of the slot cycle where the LCIB is providing wireless service using EV-DO. For example, in FIG. 4c, a newly registered EV-DO mobile station could be given a paging slot located at 2 seconds within the 5.12 second slot cycle.

The above discussions are examples of modes of alternating between the first and second wireless-communication protocols. Other modes of alternating between the first and second wireless-communication protocols are possible as well.

iii. Situation 3: Mode of Alternating for an LCIB During an Ongoing Communication Session When a communication session (e.g., a call) is placed to or from a mobile station that is registered with LCIB 116, the LCIB once again preferably changes its mode of alternating between the first and second wireless-communication protocols. In this case, LCIB 116 preferably stops alternating back and forth between the wireless-communication protocols and provides wireless-service using the wireless-communication protocol of the mobile station engaged in the ongoing communication session.

Figure 4D:
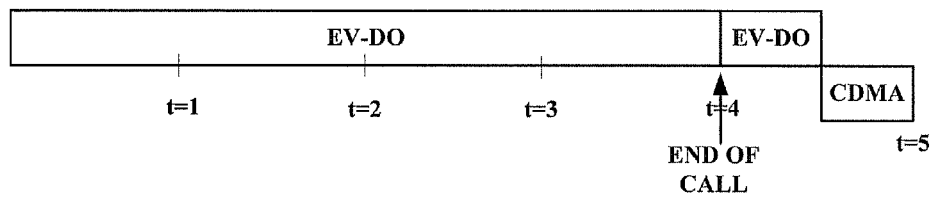

LCIB 116 may receive an origination request according to the first wireless-communication protocol from a mobile station registered with the LCIB for a call. The call origination request may include dialed digits to indicate the called party. Upon receiving the origination request, LCIB 116 may provide wireless service using the first wireless-communication protocol at least until the end of the call, as shown in FIG. 4d. After the end of the call, LCIB may continue providing wireless service using the first wireless-communication protocol for a specified period of time before returning to a mode of alternating between the first and second wireless-communication protocols, as depicted in FIG. 4d.

Alternatively, LCIB 116 may receive a termination request according to a first wireless-communication protocol for a mobile station registered with the LCIB for a call. Upon receiving the termination request, LCIB 116 may provide wireless service using the first wireless-communication protocol at least until the end of the call.

In some embodiments, during such a call, LCIB 116 may, for a brief period of time, alternate to providing wireless service in the second wireless-communication protocol. Typically, a mobile station will have a drop-call timer that is set for a period of time. For example, the drop-call timer may be set at 5 milliseconds. If the period of time that LCIB switches to the other protocol and provides wireless service using the other protocol is less than the duration of the drop-call timer, then the call will remain connected. Therefore, LCIB could alternate to providing wireless service using the other wireless-communication protocol during a time period that is less than the duration of the drop-call timer.

b. A Second Exemplary Method

Figure 5:
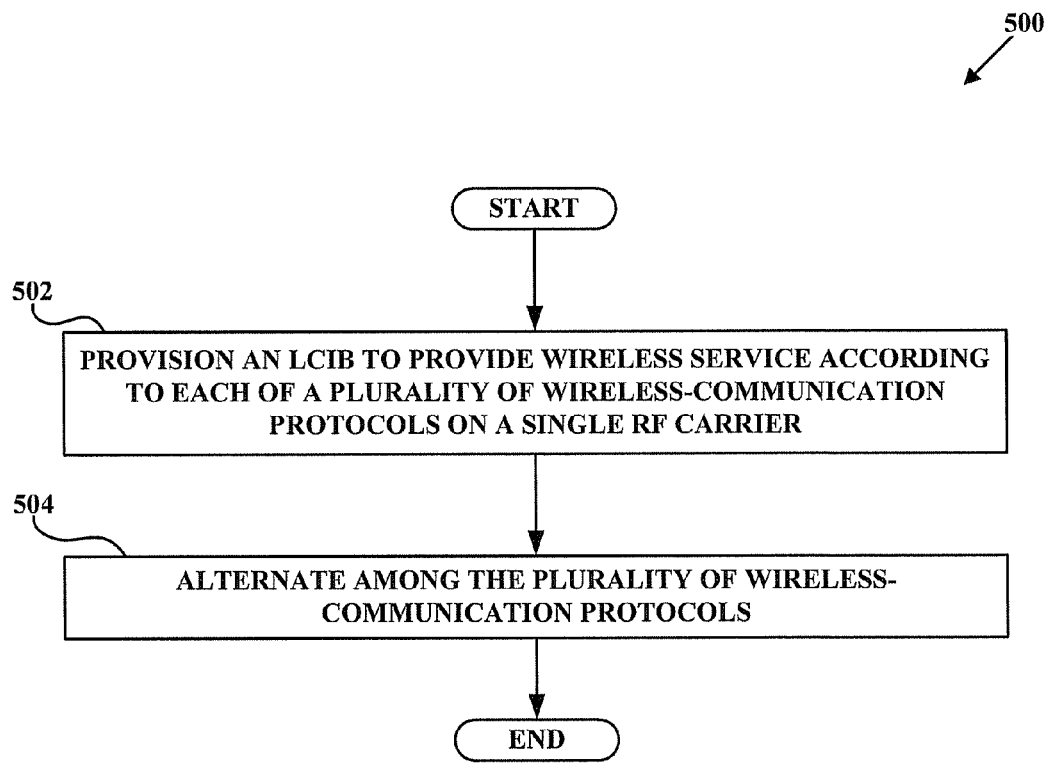
FIG. 5 is a flowchart of a method, in accordance with exemplary embodiments.

FIG. 5 is a flowchart of a second exemplary method, in accordance with an exemplary embodiment. In particular, FIG. 5 depicts a method 500, which may be carried out in conjunction with LCIB 116. Method 500 is similar in some respects to method 300, and thus is not described in as great of detail.

As shown in FIG. 5, method 500 begins at step 502, when LCIB 116 is provisioned to provide wireless service according to each of a plurality of wireless-communication protocols on a single RF carrier. The data storage 210 of LCIB 116 may include program instructions 214 executable by processor 208 to provide wireless service according to a plurality of wireless-communication protocols on a single RF carrier. The plurality of wireless-communication protocols may include any group of two or more of CDMA, EV-DO, GSM, TDMA, WiMAX, and any other wireless-communication protocol(s). At step 504, LCIB 116 alternates among the plurality of wireless-communication protocols. As discussed above, the mode of alternating among the plurality of wireless-communication protocols may depend on a variety of factors, such as the registration and call status of mobile stations registered with LCIB 116.

4. Conclusion

Various exemplary embodiments have been described above. Those skilled in the art will understand, however, that changes and modifications may be made to those examples without departing from the scope of the claims.

The invention claimed is:

1. A method comprising:
providing wireless service on a radio-frequency (RF) carrier using a first wireless-communication protocol;
providing wireless service on the RF carrier using a second wireless-communication protocol, wherein providing wireless service on the RF carrier using the first wireless-communication protocol and providing wireless service on the RF carrier using the second wireless-communication protocol occur at different times;
wherein providing wireless service on the RF carrier using the first wireless-communication protocol and providing wireless service on the RF carrier using the second wireless-communication protocol comprises alternating between providing wireless service on the RF carrier using the first wireless-communication protocol and providing wireless service on the RF carrier using the second wireless-communication protocol;
wherein alternating between providing wireless service on the RF carrier using the first wireless-communication protocol and providing wireless service on the RF carrier using the second wireless-communication protocol comprises alternating between the first and second wireless-communication protocols on a periodic basis;

wherein alternating between the first and second wireless-communication protocols on a periodic basis comprises repeatedly (a) providing service using the first wireless-communication protocol for a first amount of time and (b) providing service using the second wireless-communication protocol for a second amount of time, wherein the first amount of time is not equal to the second amount of time; and the method further comprising receiving a registration from at least one mobile station using the first wireless-communication protocol, and responsively assigning each of the at least one mobile station a respective paging slot, wherein each respective assigned paging slot occurs in each first amount of time.

2. The method of claim 1, wherein the wireless service is provided over a total period of time that is divided into a number of segments, and wherein the periodic basis is every segment.

3. The method of claim 2, wherein each segment is a positive integer number of slot cycles.

4. The method of claim 3, wherein each slot cycle has a duration of 5.12 seconds.

5. The method of claim 1, wherein:
the first amount of time has a duration that is equal to a duration of a first positive integer number of slot cycles; and
the second amount of time has a duration that is equal to a duration of a second positive integer number of slot cycles.

6. The method of claim 1, wherein:
the first amount of time has a duration that is less than a duration of a slot cycle; and
the second amount of time has a duration that is substantially equal to the duration of the slot cycle minus the duration of the first amount of time.

7. The method of claim 1, further comprising:
receiving an origination request according to the first wireless-communication protocol from a mobile station for a communication session; and
upon receiving the origination request, providing wireless service using the first wireless-communication protocol at least until the end of the communication session.

8. The method of claim 1, further comprising:
receiving a termination request according to the first wireless-communication protocol for a mobile station for a communication session; and
upon receiving the termination request, providing wireless service using the first wireless-communication protocol at least until the end of the communication session.

9. The method of claim 1, wherein the wireless service is provided over a total period of time that is divided into a number of segments, and wherein alternating between the first wireless-communication protocol and the second wireless-communication protocol comprises alternating every segment.

10. A method comprising:
providing wireless service on a radio-frequency (RF) carrier using a first wireless-communication protocol;
providing wireless service on the RF carrier using a second wireless-communication protocol, wherein providing wireless service on the RF carrier using the first wireless-communication protocol and providing wireless service on the RF carrier using the second wireless-communication protocol occur at different times;

wherein providing wireless service on the RF carrier using the first wireless-communication protocol and providing wireless service on the RF carrier using the second wireless-communication protocol comprises alternating between providing wireless service on the RF carrier using the first wireless-communication protocol and providing wireless service on the RF carrier using the second wireless-communication protocol;

wherein the wireless service is provided over a total period of time that is divided into a number of segments, and wherein alternating between the first wireless-communication protocol and the second wireless-communication protocol comprises alternating every segment; and the method further comprising:
receiving a registration from a mobile station, wherein the mobile station uses the first wireless-communication protocol; and
upon receiving the registration, adjusting alternating between the first wireless-communication protocol and the second wireless-communication protocol every segment, wherein adjusting comprises alternating between (a) providing service using the first wireless-communication protocol for a first amount of time and (b) providing service using the second wireless-communication protocol for a second amount of time, wherein the first amount of time is greater than the second amount of time.

11. The method of claim 10, further comprising:
receiving an origination request from the mobile station for a communication session; and
upon receiving the origination request from the mobile station, adjusting alternating between (a) providing service using the first wireless-communication protocol for a first amount of time and (b) providing service using the second wireless-communication protocol for a second amount of time, wherein adjusting comprises:
providing wireless service using the first wireless-communication protocol at least until the end of the communication session.

12. The method of claim 10, further comprising:
receiving a termination request for the mobile station for a communication session; and
upon receiving the termination request for the mobile station, adjusting alternating between (a) providing service using the first wireless-communication protocol for a first amount of time and (b) providing service using the second wireless-communication protocol for a second amount of time, wherein adjusting comprises:
providing wireless service using the first wireless-communication protocol at least until the end of the communication session.

13. A low-cost Internet base station (LCIB) comprising:
a communication interface;
a processor; and
data storage comprising instructions executable by the processor to (i) provide wireless service on a radio-frequency (RF) carrier using a first wireless-communication protocol; and (ii) provide wireless service on the RF carrier using a second wireless-communication protocol, wherein providing wireless service on the RF carrier using the first wireless-communication protocol and providing wireless service on the RF carrier using a second wireless-communication protocol occur at different times;

wherein the instructions are further executable by the processor to alternate between providing wireless service on the first RF carrier using the first wireless-communication protocol and providing wireless service on the first RF carrier using the second wireless-communication protocol;

wherein alternating between providing wireless service on the RF carrier using the first wireless-communication protocol and providing wireless service on the RF carrier using the second wireless-communication protocol comprises alternating between the first and second wireless-communication protocols on a periodic basis;

wherein alternating between the first and second wireless-communication protocols on a periodic basis comprises repeatedly (a) providing service using the first wireless-communication protocol for a first amount of time and (b) providing service using the second wireless-communication protocol for a second amount of time, wherein the first amount of time is not equal to the second amount of time; and wherein the instructions are further executable by the processor to receive a registration from at least one mobile station using the first wireless-communication protocol, and responsively assign each of the at least one mobile station a respective paging slot, wherein each respective assigned paging slot occurs in each first amount of time.

14. The LCIB of claim 13, wherein the first wireless-communication protocol and the second wireless-communication protocol are two different protocols selected from the group consisting of Code Division Multiple Access (CDMA), Evolution Data Optimized (EV-DO), Global System for Mobile Communications (GSM), Time Division Multiple Access (TDMA), and WiMAX.

* * * * *